(12) United States Patent
Inoue

(10) Patent No.: US 6,343,939 B1
(45) Date of Patent: Feb. 5, 2002

(54) ELECTRIC CONNECTION METHOD AND STRUCTURE BETWEEN SEAT AND BODY

(75) Inventor: Takuya Inoue, Nagoya (JP)

(73) Assignees: Harness System Technologies Research, Ltd.; Sumitomo Wiring Systems, Ltd.; Sumitomo Electric Industries, Ltd., all of Mie (JP)

( * ) Notice: Subject to any disclaimer, the term of this patent is extended or adjusted under 35 U.S.C. 154(b) by 0 days.

(21) Appl. No.: 09/652,784

(22) Filed: Aug. 31, 2000

(30) Foreign Application Priority Data

Oct. 21, 1999 (JP) ............................................ 11-300152

(51) Int. Cl.⁷ .............................................. H01R 13/64
(52) U.S. Cl. ........................................ 439/34; 439/248
(58) Field of Search ........................ 439/34, 247, 248, 439/246; 296/63, 146.7

(56) References Cited

U.S. PATENT DOCUMENTS

| | | | |
|---|---|---|---|
| 5,813,880 A | * 9/1998 | Kodama | 439/364 |
| 5,836,787 A | * 11/1998 | Kodama | 439/567 |
| 6,050,835 A | * 4/2000 | Hanrion et al. | 439/247 |
| 6,159,019 A | * 12/2000 | Norizuki et al. | 439/34 |

FOREIGN PATENT DOCUMENTS

| | | |
|---|---|---|
| EP | 0 909 676 A2 | 4/1999 |
| EP | 0 911 211 A1 | 4/1999 |
| JP | A 11-198743 | 7/1999 |

* cited by examiner

Primary Examiner—Tulsidas Patel
(74) Attorney, Agent, or Firm—Oliff & Berridge, PLC

(57) ABSTRACT

A connector (22) for connecting a harness disposed in a seat (10) to a body side is disposed at the lower surface of the seat (10) and a connector (28) for connecting a wire harness (26) disposed in the body (1) is disposed on the upper surface of the body (1). Both the connectors (22) and 28) are opposed to each other in a sliding direction of the seat (10) so that both the connectors (22) and (28) are connected to each other in accordance with the sliding shift of the seat (10). The connector (28) on the body (1) side is held so as not to be separated therefrom in a state that the connector (28) engages with the holder (32). When both the connectors (22) and (28) are connected, the engagement state of the holder (32) with respect to the connector (22) is released by the connector (28) on the seat (10) side, so that the connector (28) can be drawn from the holder (32) while maintaining the connecting state between both the connectors (22) and (28).

5 Claims, 7 Drawing Sheets

ELECTRIC CONNECTION METHOD AND STRUCTURE BETWEEN SEAT AND BODY

BACKGROUND OF THE INVENTION

1. Field of the Invention

The present invention relates to an electric connection structure between a seat and a body which is arranged to, in a vehicle etc., electrically connect various kinds of electrical equipments to be mounted on the seat and electric equipments on the body side while connecting connectors.

2. Description of the Related Art

Conventionally, it has been performed generally to mount electric equipments such as an electric moving mechanism etc. on the seat of an automobile. In the assembling procedure of such a kind of an automobile, various kinds of electric equipments are electrically connected to the body (vehicle body) side at the time of attaching the seat. To be more concrete, the seat is set on a sliding mechanism fixed to the body side. Thereafter, in the space between the seat and the body, the connector of a wire harness introduced to the rear surface of the seat and connected to the various kinds of electric equipments is connected to the connector of a wire harness disposed on the body side.

However, in recent years, since the ratio of the intelligence equipments mounted in an automobile has been increased, many electric equipments such as a seat heater, an air bag etc. as well as the electric moving mechanism are mounted on the seat. In such a kind of the seat, since the number of the poles of the connector is large, the working efficiency at the time of connecting the connectors is quite bad.

Thus, in order to overcome such a problem, the following connecting method is actually performed, for example. That is, the wire harness introduced from the electric equipments of the seat or the wire harness introduced from the body side is set to have a long length, and, for example, the seat is temporarily placed at the side portion of the sliding mechanism before attaching the seat. In this state, the wire harness on the seat side and the wire harness on the body side are mutually connected. Thereafter, the seat is lifted and set on the sliding mechanism.

In this case, since it is not necessary to connect the connectors in the narrow space between the seat and the body, the working efficiency at the time of connecting the connectors can be improved. However, since each of the wire harnesses is set to have the long length, there arises a fear that the wire harnesses are likely sandwiched between the seat and the sliding mechanism when attaching the seat. In this respect, at the time of lifting and setting the seat on the sliding mechanism after temporarily placing the seat having a heavy weight due to the many electric equipments mounted thereon at the side portion of the sliding mechanism and connecting the connectors, in order to remove such a fear, it is required to set the seat on the sliding mechanism while paying the attention about not to sandwich the wire harnesses etc. therebetween. Such a procedure is very troublesome and requires much labor, and so the working efficiency of the entire seat attaching procedure is not necessarily good.

SUMMARY OF THE INVENTION

The present invention has been made in order to obviate the aforesaid conventional problem, and an object of the invention is to provide an electric connection structure between a seat and a body which can improve the working efficiency of the attachment procedure of the seat on which electric equipments are mounted.

In order to obviate the aforesaid problem, the invention is arranged in a manner that in an electric connection structure between a seat and a body in which the seat is attached with respect to the body so as to be able to slide and a connector provided at the seat is connected with a connector provided at the body, the connectors are attached so as to oppose to each other in the sliding direction of the eat so that the connectors are connected to each other in accordance with the sliding shift of the seat, and a release means is provided which releases an attachment state of one of the connectors with respect to the seat or the body in response to connection of the connectors thereby to separate the one connector from the seat or the body.

According to this structure, when the seat is attached to the body and the seat is slid, both the connectors are automatically connected to each other, whereby the electric equipments mounted on the seat can be electrically connected to the wire harness etc. on the body side. Then, when both the connectors are connected, the attachment state of one of the connectors with respect to the seat or the body is released, whereby the one connector can be shifted freely and the connecting state of both the connectors is maintained.

A holder for holding the one connector so as to be able to engage with and separate from the one connector is provided as the release means in the seat or the body. The holder may be arranged in a manner that the holder holds the one connector so as not to separate therefrom until the connectors are connected and, when the connectors are connected, releases an engagement state with respect to the one connector to allow the one connector to separate from the holder. To be more concrete, the holder is provided with an engagement piece of a plate spring shape, and the holder and the one connector held by the holder may be configured in a manner that the engagement piece engages with a hook provided at the one connector thereby to hold the one connector by the holder so as not to separate therefrom, and when housings of the connectors are fitted, the engagement piece is pushed and bent by the housing of the partner-side connector to release an engagement state with respect to the hook so that the one connector is able to separate from the holder.

At least one of the connectors may be attached so as to be able to shift in a direction perpendicular to the sliding direction of the seat. In this case, even if there are errors at the attachment positions of both the connectors, since the one connector is allowed to shift relatively in the aforesaid direction. Thus, such errors can be absorbed and so both the connectors can be connected well without difficulty.

The invention is arranged in a manner that an electric connection method between a seat and a body in which the seat is attached with respect to the body so as to be able to slide and a connector provided at the seat is connected with a connector provided at the body, the connectors are attached to the body and the seat so as to oppose to each other in a sliding direction, respectively, then the seat is attached to the body, then the connectors are connected to each other by sliding the seat, and then an attachment state of one of the connectors with respect to the seat or the body is released.

According to this method, the electric equipments mounted on the seat can be electrically connected to the wire harness etc. on the body side quite easily by merely attaching the seat on the body and sliding the seat.

DETAILED DESCRIPTION OF THE PREFERRED EMBODIMENTS

Preferred embodiments of the invention will be described with reference to the accompanying drawings.

Figure 1:
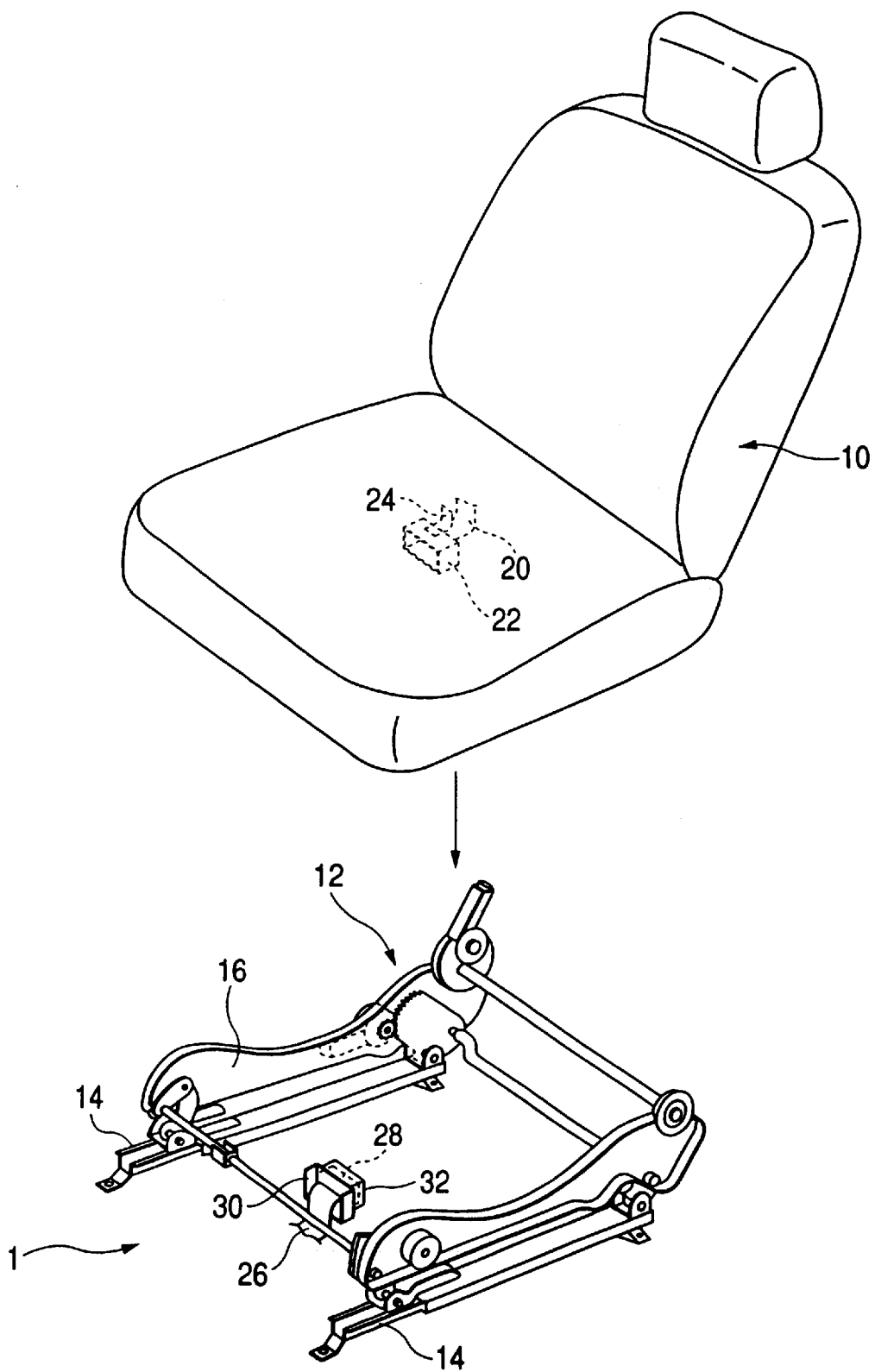
FIG. 1 is an exploded perspective view showing the attachment structure for a seat to which the invention is applied.

FIG. 1 shows an exploded perspective view of the attachment structure for attaching a seat to a body. As shown in this figure, a seat 10 is attached to a sliding mechanism 12 fixed to a body 1. The sliding mechanism 12 includes a pair of rails 14 extending to the longitudinal direction of the body 1 and a base 16 attached to the rail 14 so as to be movable along the rail. The seat 10 is attached on the base 16. According to such a configuration, the seat 10 is attached to the sliding mechanism so as to be able to slide in the longitudinal direction of the body 1.

Figure 2:
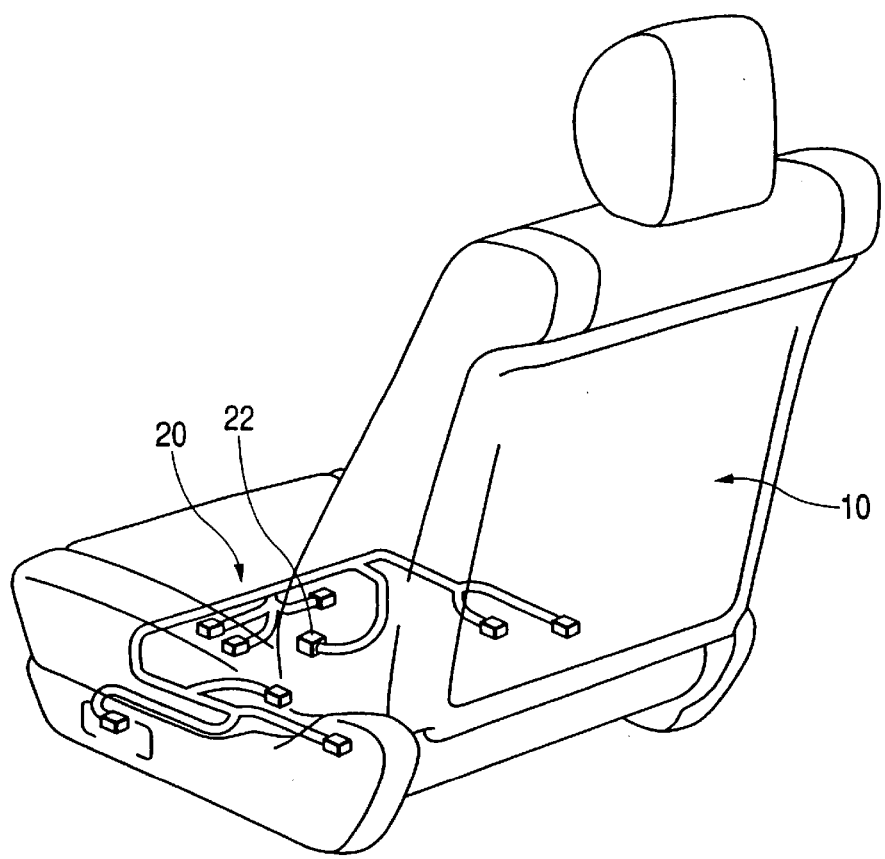
FIG. 2 is a schematic perspective view showing the seat in which a wire harness is disposed.

Electric equipments (not shown) such as an electric moving mechanism, a seat heater etc. are mounted on the seat 10 and further, as shown in FIG. 2, a wire harness 20 connected to these electric equipments is disposed in the seat. As shown in FIG. 1, a connector 22 (hereinafter called a first connector 22) for connecting the wire harness 20 to the body 1 side is attached to the rear surface (lower surface) of the seat 10. On the other hand, a connector 28 (hereinafter called a second connector 28) for connecting a wire harness 26 disposed in the body 1 to the seat 10 side is attached to the major surface of the body 1. When the seat 10 is subjected to the sliding operation, both the connectors 22 and 28 are connected to each other so that the various kinds of the electric equipments mounted on the seat 10 are electrically connected to the wire harness 26 on the body 1 side.

As shown in FIGS. 1 and 7A to 7C, the first connector 22 is fixed to the rear surface of the seat 10 in a protruded state through an attachment metal member 24. The fixing position of the first connector is set so as to oppose to the second connector 28 in a state that the seat 10 is attached to the sliding mechanism 12.

Figure 3:
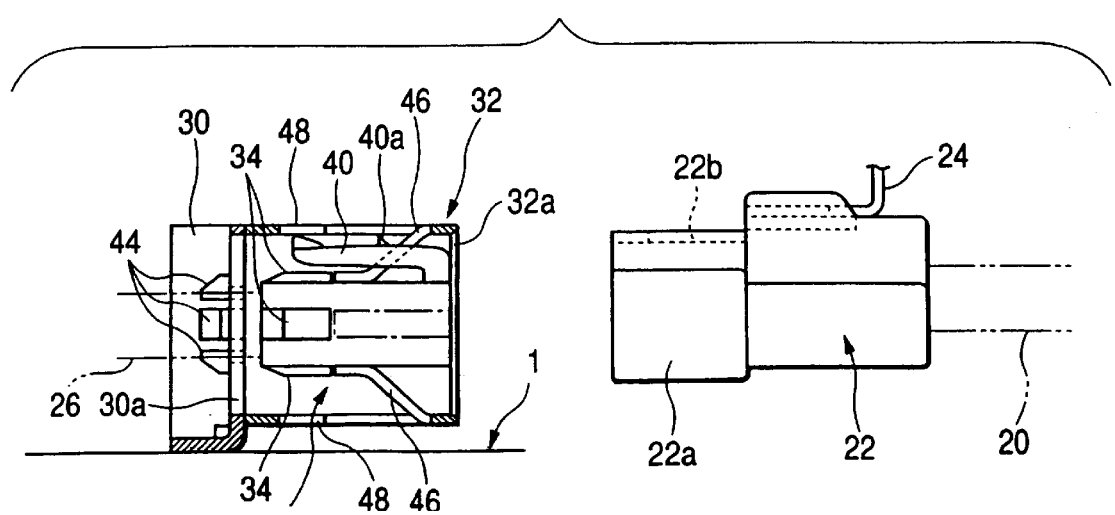
FIG. 3 is a side view (partially sectional view) showing the relation between a first connector attached to the seat and a second connector attached to a body side.

As shown in FIGS. 2 and 3, the first connector 22 is configured as a female type housing having at the center portion thereof a housing fitting concave portion (not shown) formed by a hood 22a so that the housing of the second connector 28 is capable of being fitted into the housing fitting concave portion. An opening portion 22b is formed on the upper surface of the hood 22a of the first connector 22 in a manner that when the hook 40a of a connector lock portion 40 described later of the second connector 28 engages with the edge portion of the opening portion in a state that the housing of the second connector 28 is fitted into the housing fitting concave portion, both the connectors 22 and 28 are locked in a fitted state.

On the other hand, the second connector 28 is formed as a male type housing capable of being fitted into the housing of the first connector 22. As shown in FIG. 1, the second connector is attached at the position opposing to the first connector 22 in a state that the second connector is held by a holder 32 fixed to the body 1.

Figure 4:
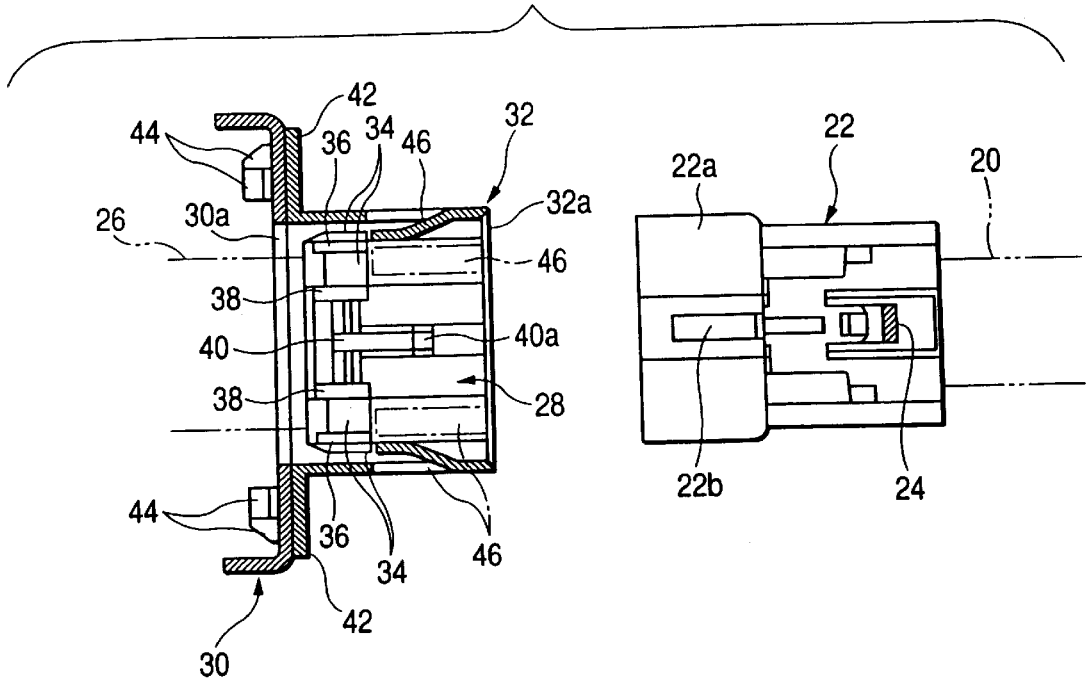
FIG. 4 is a plan view (partially sectional view) showing the relation between the first connector attached to the seat and the second connector attached to the body side.

To be described more in detail, as shown in FIGS. 3 to 6, the body 1 is provided with an attachment panel 30 which is elected from the body and has a through hole 30a passing therethrough in the longitudinal direction of the body 1 (left and right direction in FIGS. 3 and 4). The holder 32 is fixed to the attachment panel 30.

The holder 32 is formed in a hollow box shape having attachment flanges 42 which are provided at the left and right sides (upper and lower sides in FIG. 4) of the holder to penetrate in the longitudinal direction therethrough. The holder is attached to the rear side of the attachment panel 30 (the rear side of the body 1) in a manner that hooks 44 protrusively provided at the flanges 42 are fitted into the through hole 30a of the attachment panel 30 and engaged with the edge portion thereof. Each of the hooks 44 is formed so as to be able to elastically deform to some extent, whereby the holder 32 is allowed to be shifted to some extent in the sliding direction of the seat 10, that is, an arbitrary direction perpendicular to the longitudinal direction.

A plurality of engagement pieces 46 of plate spring shape are provided on the inner wall surface of the holder 32. Each of the engagement pieces 46 is lifted from the portion near an opening portion 32a at the rear side of the holder 32 and extends to the front side thereof.

Figure 5:
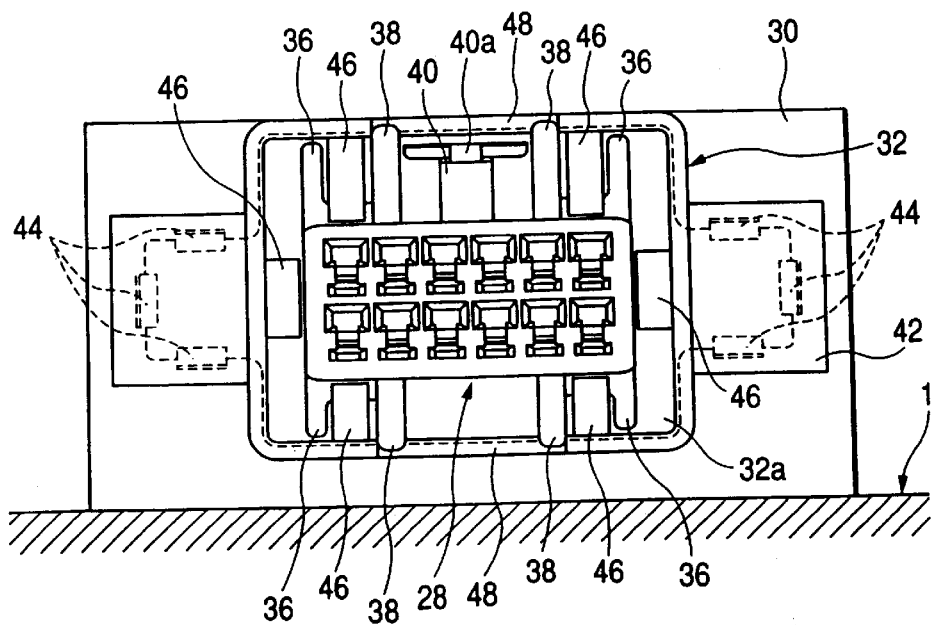
FIG. 5 is a diagram showing the second connector held by a holder seen from the direction shown by an arrow A in FIG. 6.
Figure 6:
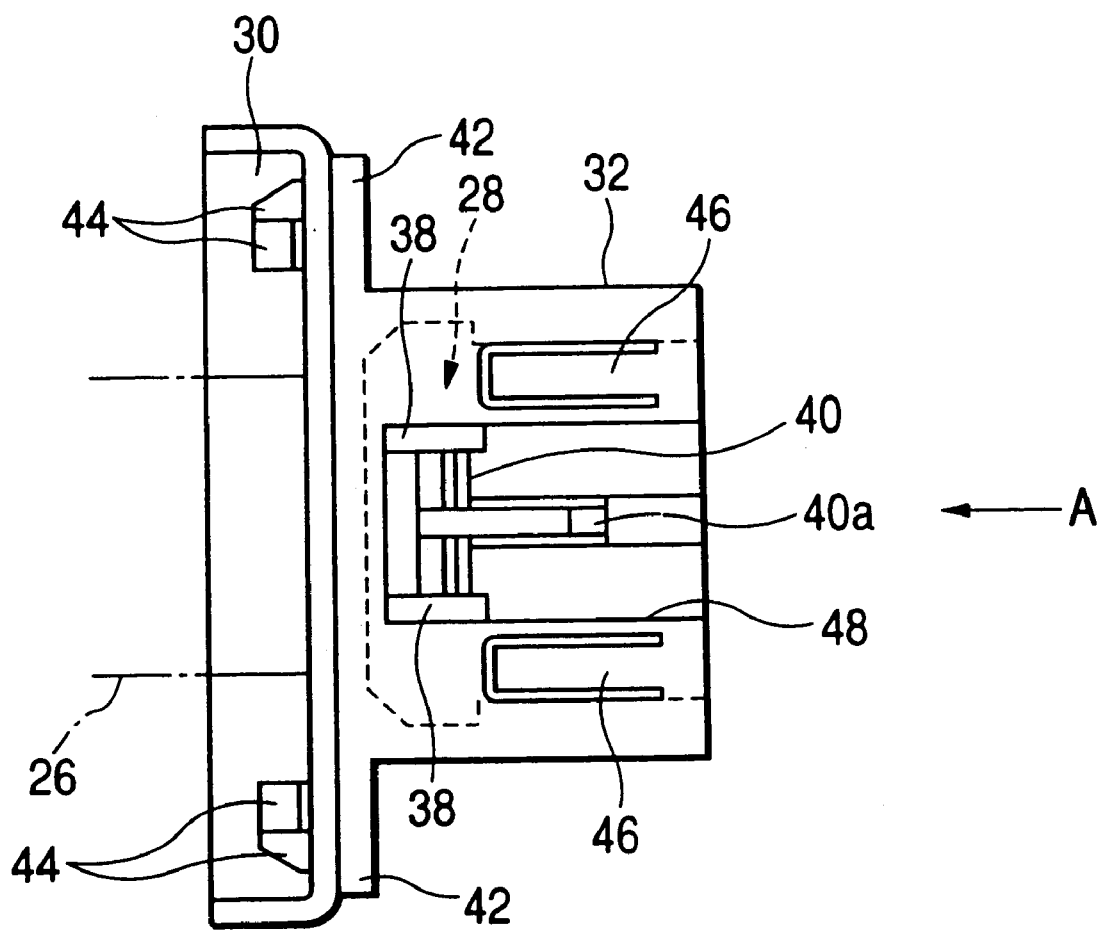
FIG. 6 is a plan view showing the second connector held by the holder.

The second connector 28 is inserted within the holder 32 from the opening portion 32a of the holder 32 while pushing and bending the engagement pieces 46 outside so as to widen the distance therebetween. Further, the wire harness 26 to be connected to the connector 28 is introduced to the front side of the body 1 through the opening portion 32b on the front side of the holder 32 and the through hole 30a of the attachment panel 30, so that the second connector 28 is held within the holder 32. As shown in FIGS. 5 and 6, guide notches 48 are formed at the upper and lower surfaces of the holder 32 so as to be opened on the opening portion 32a side and extend in the longitudinal direction. The second connector 28 is inserted within the holder 32 while guide projections 38 protrusively provided on the upper and lower surfaces of the housing of the second connector 28 are guided along the notches 48 (the guide projections 38 are omitted in FIG. 3 merely for convenience's sake).

Ribs 36 protrusively provided on the upper and lower surfaces of the housing of the second connector 28 abut against the upper and lower wall surfaces of the holder 32 within the holder 32, respectively, whereby the second connector 28 is positioned with respect to the holder 32 in the upper and lower direction. On the other hand, the guide projections 38 of the first connector 22 are guided along the notches 48, respectively, whereby the second connector 28 is positioned in the left and right direction (the direction perpendicular on the horizontal plane to the longitudinal direction which is the sliding direction of the seat 10). Further, the respective engagement pieces 46 are pressed from the outside so as to contact to the vertical and horizontal side surfaces of the second connector 28, so that the second connector 28 is held at almost sectional center portion of the holder 32 in a posture opposing to the first connector 22.

The guide projections 38 of the second connector 28 abut against the front end portions of the notches 48. The engagement pieces 46 engage with the hooks 34 formed at the vertical and horizontal side surfaces of the housing of the second connector 28, whereby the second connector 28 is held by the holder 32 in a state that the second connector is prevented from being shifted in the longitudinal direction.

In FIGS. 3 to 6, a reference numeral 40 depicts the connector lock portion of a plate spring shape formed on the upper surface of the second connector 28. A hook 40*a* capable of engaging with the hood 22*a* of the first connector 22 is protrusively provided on the major surface of the connector lock portion.

The procedure for attaching the seat 10 on the body 1 will be explained with reference to FIGS. 7 to 9.

As a preparatory stage for attaching the seat 10, for example, the base 16 of the sliding mechanism 12 is set at the rear end position thereof, that is, the most rear side position thereof in the range capable of sliding. In this state, the seat 10 is fixed on the base 16.

Figure 7A:
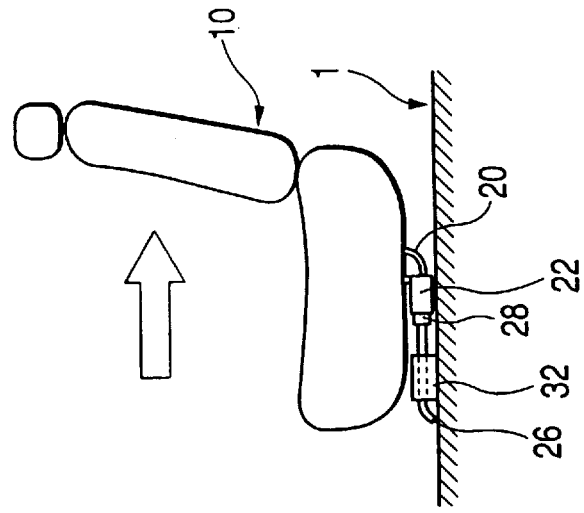
FIGS. 7A to 7C are schematic diagrams for explaining the attachment procedure of the seat with respect to the body.
Figure 7B:
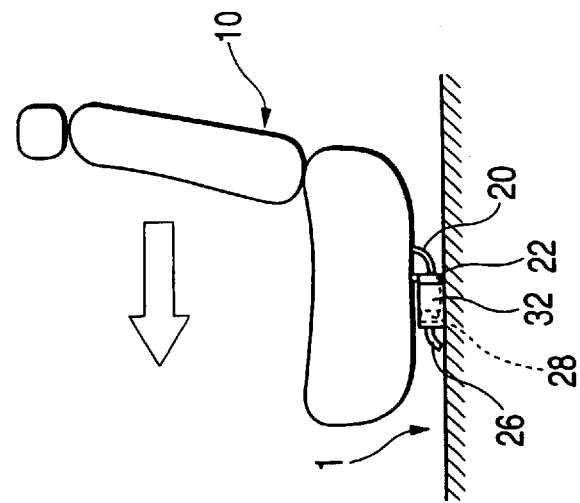

When the fixing procedure of the seat 10 on the base 16 is completed (FIG. 7A, the sliding mechanism 12 is operated to move the seat 10 in the forward direction thereby to approach the first connector 22 to the second connector 28. Thus, the first connector 22 moves within the holder 32 through the opening portion 32*a,* so that the housing of the second connector 28 starts fitting into the housing fitting concave portion of the first connector 22 (FIG. 7B). In this case, although the second connector 28 is pushed toward the forward direction by the first connector 22, the guide projections 38 of the second connector 28 abut against the front end portions of the notches 48 of the holder 32 thereby to prevent the second connector 28 from being shifted in the forward direction, as described above. Thus, the fitting operation between the housing of the first connector 22 and the housing of the second connector 28 can be performed smoothly. Further, even in the case where there is a small error in the attachment procedure of the first connector 22 with respect to the seat 10 or the attachment procedure of the second connector 28 with respect to the body 1 and both the first connector 22 and the second connector 28 are slightly deviated in the direction perpendicular to the sliding direction (longitudinal direction) of the seat 10, the holder 32 can be shifted in an arbitrary direction perpendicular to the sliding direction of the seat 10, as described above. Thus, when the fitting operation between the first connector 22 and the second connector 28 starts, the second connector 28 shifts in accordance with the attachment position of the first connector 22, whereby both the connectors 22 and 28 can be fitted smoothly and well.

Figure 8:
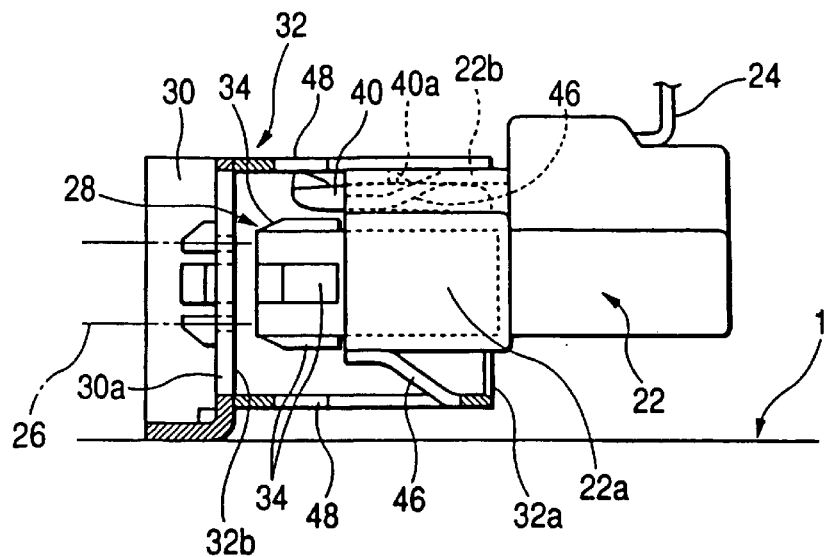
FIG. 8 is a side view (partially sectional view) corresponding to FIG. 3 showing a state where the first connector and the second connector are connected.
Figure 9:
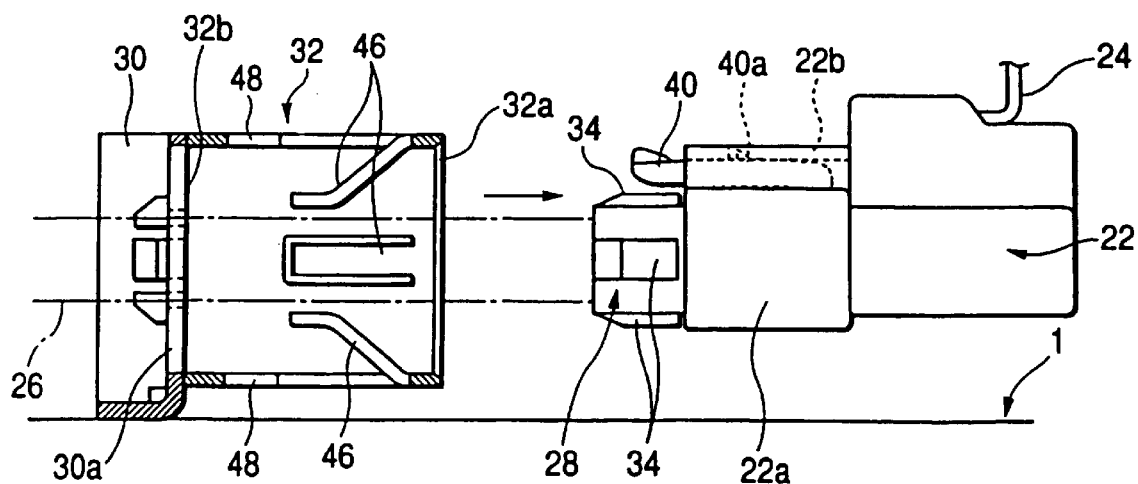
FIG. 9 is a side view (partially sectional view) corresponding to FIG. 3 showing a state where the second connector is drawn from the holder.
Figure 10:
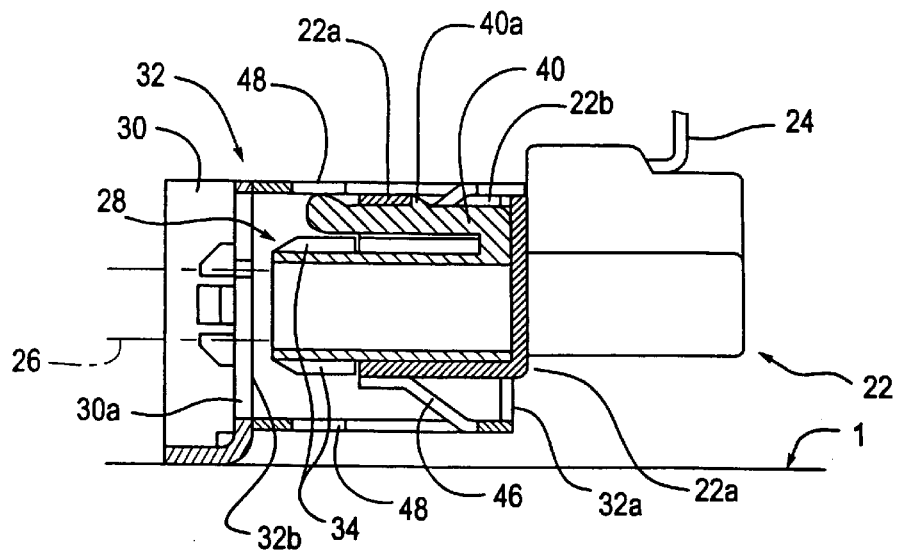
FIG. 10 is a cross-sectional view corresponding to FIG. 8.
Figure 11:
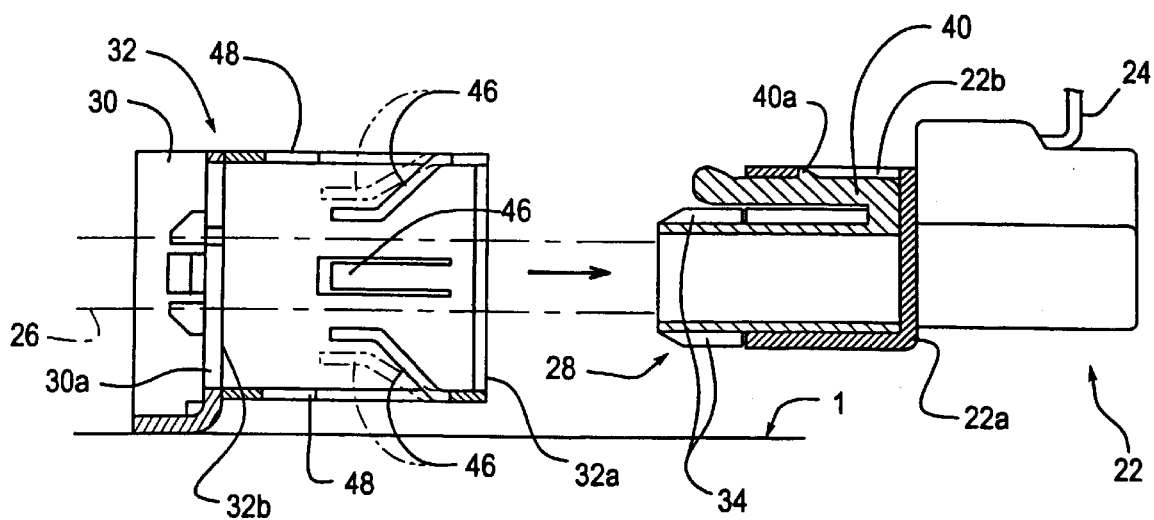
FIG. 11 is a cross-sectional view corresponding to FIG. 9.

When the seat 10 is further moved in the forward direction, as shown in FIG. 8, the engagement pieces 46 of the holder 32 are pushed outside by the hood 22*a* of the first connector 22 thereby to release the engagement state of the engagement pieces 46 with respect to the hooks 34. Then, when the housings of both the connectors 22 and 28 are fitted to each other to such a position that the tip end of the housing of the first connector 22 abuts against the hooks 34 of the second connector 28, the hook 40*a* of the connector lock portion 40 of the second connector 28 moves into the opening portion 22*b* of the first connector 22 and engages with the hood 22*a*. Thus, the housings of both the connectors 22 and 28 are locked in the fitting state, whereby both the connectors 22 and 28 are connected to each other.

Figure 7C:
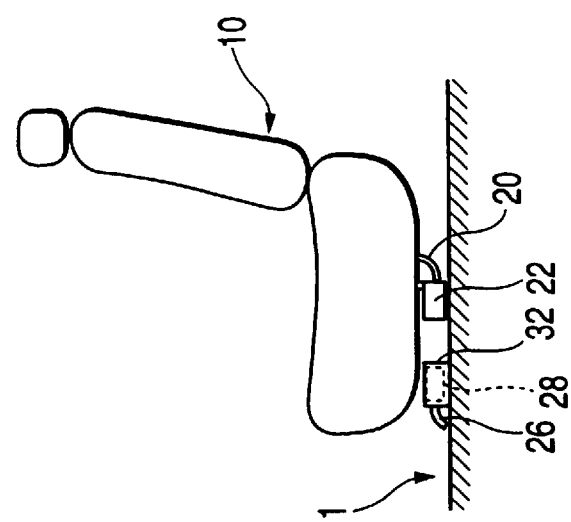

In this manner, when both the connectors 22 and 28 are connected to each other, the seat 10 is moved in the rear direction. Thus, the housings of both the connectors 22 and 28 are locked in the fitting state and the engagement state of the engagement pieces 46 with respect to the hooks 34 is released. As a result, as shown in FIGS. 7C and 9, the second connector 28 is drawn from the holder 32 together with the wire harness 26 while maintaining the connecting state between the first connector 22 and the second connector 28. Therefore, the electrical connection between the electric equipments mounted on the seat 10 and the wire harness 20 disposed in the body 1 are attained and so the attachment procedure of the seat 10 with respect to the body 1 is completed.

As described above, according to the aforesaid electric connection structure, the electric equipments mounted on the seat 10 and the wire harness 26 disposed in the body 1 can be electrically connected by merely attaching the seat 10 on the sliding mechanism 12 and sliding the seat 10 in the longitudinal direction. Thus, as.compared with the conventional electric connection structure in which it is required to connect the connectors in the narrow space between the seat and the body after attaching the seat on the sliding mechanism, the invention can improve working efficiency of the attachment procedure of the seat 10 with respect to the body 1 remarkably.

In particularly, in the conventional electric connection structure, the workers perform the connector connecting procedure manually. Thus, when many electric equipments are mounted on the seat and the number of the poles of the connector increases, the connecting resistor of the connectors increases and hence the connector connecting procedure becomes difficult.

In contrast, according to the electric connection structure of the invention, even when the number of the poles of the connector is many, the first connector 22 of the seat 10 and the second connector 28 of the body 1 side can be connected easily by merely sliding the seat 10 in the longitudinal direction. Accordingly, the invention is also advantageous in that the working efficiency at the time of attaching the seat 10 is scarcely influenced depending on the number or the kinds of the electric equipments mounted on the seat 10 and so the connector connecting procedure can be performed quite easily.

Incidentally, the electric connection structure of the aforesaid embodiment merely shows an example of the electric connection structure of the invention, and the concrete configuration thereof may be suitably changed within a range of the gist of the invention.

For example, in the aforesaid embodiment, the holder 32 fixed on the body 1 side holds the second connector 28 and the first connector 22 is fixed to the seat 10, the invention may be modified in a manner that the holder is fixed to the seat 10 to hold the first connector 22 and the second connector 28 is fixed to the body 1. In this case, for example, the housing of the first connector 22 is configured as a female type housing and the housing of the second connector 28 is configured as a female type housing.

Although in the aforesaid embodiment, both the connectors 22 and 28 are attached to the seat 10 and the body 1, respectively, so that both the connectors 22 and 28 are connected to each other when the seat 10 is moved in the forward direction after attaching the seat 10 on the sliding mechanism 12, the invention may be modified in a manner that the both the connectors 22 and 28 are attached to the seat 10 and the body 1, respectively, so that both the connectors 22 and 28 are connected to each other when the seat 10 is moved in the backward direction. When the seat is configured so as to be able to slide in the left and right direction (that is, direction perpendicular on the horizontal plane to the longitudinal direction of the body 1) like a station wagon etc., the invention may be modified in a manner that the both the connectors 22 and 28 are attached to the seat 10 and the body 1, respectively, so that both the connectors 22 and 28 are connected to each other when the seat is slid in the left and right direction. In short, the electric connection structure of the invention may be arranged in a manner that both the connectors 22 and 28 are connected to each other in accordance with the sliding shift of the seat 10.

Although the explanation is omitted in the aforesaid embodiment, the electric connection structure of the invention may be arranged in the following manner, preferably. That is, at the time of attaching both the connectors 22 and 28 to the seat 10 and the body 1, respectively, it is set that the housings of both the connectors 22 and 28 are completely fitted when the seat 10 is shifted to the most forward position within the range capable of being slid, for example. After both the connectors 22 and 28 are connected and the second connector 28 is once drawn from the holder 32, the seat 10 is prevented from being shifted in the forward direction side from the constant position due to the provision of a stopper at the rails 14. That is, if the seat 10 is allowed to be slid within the entire movable range of the seat after connecting both the connectors 22 and 28, when the seat 10 is slid in the forward direction after the connection of the connectors, the second connector 28 may collide with the holder 32 to break the second connector 28 or cut the wire harness 26. In order to prevent such a phenomenon, the electric connection structure of the invention may be arranged preferably in a manner that after both the connectors 22 and 28 are connected and the second connector 28 is once drawn from the holder 32, the range allowing the seat 10 to slide is limited by the stopper as described above to prevent the breakage of the connectors etc. The method of limiting the allowable sliding range of the seat 10 is not limited to the aforesaid mechanical method in which the stopper is provided at the rails 14. For example, when the electric moving mechanism is incorporated within the seat 10, the allowable sliding range of the seat 10 may be limited by using the controlling method thereof.

Further, the aforesaid embodiment employs such a configuration as the releasing means of the invention that the second connector 28 is held within the holder 32 by engaging the engagement pieces 46 of the holder 32 with the hooks 34 of the second connector 28, and when both the connectors 22 and 28 are connected in accordance with the sliding operation of the seat 10, the engagement state of the engagement pieces 46 is released by the hood 22a of the first connector 22 thereby to allow the second connector 28 from being drawn from the holder 32. In short, any configuration may be employed as the releasing means so long as it is arranged in a manner that after both the connectors 22 and 28 are connected, the attachment state of one of the connectors 22 and 28 with respect to the seat 10 or the body 1 is released to maintain the connecting state of the connectors. The configuration of the releasing means may be suitably selected in accordance with the concrete seat attachment structure etc.

As described above, the electric connection structure of the invention is arranged in a manner that the connector on the seat side and the connector on the body side are disposed so as to oppose to each other in the sliding direction of the seat, then both the connectors are connected to each other in accordance with the sliding shift of the seat, and when both the connectors are connected once, one of the connectors on one of the seat side and body side is separated from the seat or the body by means of the releasing means to maintain the connecting state of both the connectors. Thus, at the time of mounting the seat, after attaching the seat to the body, the electric equipments mounted on the seat and the wire harness etc. on the body side can be electrically connected easily by merely sliding the seat. Accordingly, as compared with the conventional electric connection structure in which it is required to connect the connectors in the narrow space between the seat and the body after attaching the seat, the invention can improve the working efficiency of the attachment procedure of the seat remarkably.

In particular, in the structure of the invention, when at least one of both the connectors is attached so as to be able to be shifted in the direction perpendicular to the sliding direction of the seat, both the connectors can be connected well even if there are errors at the attachment positions of both the connectors.

What is claimed is:

1. An electric connection structure between a seat and a body in which said seat is slidably attached onto said body, said structure comprising:
    a seat-side connector disposed on said seat;
    a body-side connector disposed in a holder, the holder attached to said body, said seat-side and body-side connectors being attached so as to oppose each other in a sliding direction of said seat so that said seat-side and body-side connectors are connected to each other, wherein said body-side connector is pushed toward a forward direction by said seat-side connector, guide projections of said body-side connector abut against front end portions of notches of said holder thereby preventing said body-side connector from being shifted in the forward direction; and
    release means for releasing an attachment state of one of said seat-side and body-side connectors with respect to other of said seat-side or said body-side connector in response to sliding movement of said seat-side and body-side connectors in a direction opposite of said sliding direction to separate said seat-side or said body-side connector from other of said seat-side or said body-side connector.

2. An electric connection structure according to claim 1, wherein the holder for holding said body-side connector is engaged with and separate from said seat-side connector, and said holder holds said body-side connector so as not to separate therefrom until said connectors are connected and when said seat-side and body-side connectors are connected, releases an engagement state with respect to said body-side connector to allow said body-side connector to separate from said holder.

3. An electric connection structure between a seat and a body according to claim 2, wherein said holder is provided with an engagement piece of a plate spring shape, and said holder and said body-side connector held by said holder are configured in a manner that said engagement piece engages with a hook provided at said body-side connector thereby to hold said body-side connector by said holder so as not to separate therefrom, and when housings of said seat-side and body-side connectors are fitted, said engagement piece is pushed and bent by the housing of the seat-side connector to release an engagement state with respect to said hook so that said body-side connector is able to separate from said holder.

4. An electric connection structure between a seat and a body according to claim 1, wherein at least one of said seat-side and body-side connectors is attached so as to shift in a direction perpendicular to the sliding direction of said seat.

5. A method of electrically connecting a seat and a body, said seat being slidably attached to said body, comprising the steps of:

providing a seat-side connector providing a body-side connector disposed in a holder attached to said body, said seat-side and body-side connectors being attached so as to oppose each other in a sliding direction of said seat so that said seat and body-side connectors are connected to each other, wherein said body-side connector is pushed forward toward a forward direction by said seat-side connector guide projections of said body side connector abut against front end portions of notches of said holder thereby preventing said body-side connector from being shifted in the forward direction; and releasing an attachment state of one of said seat-side body-side connectors in response to sliding movement of said seat-side and body-side connector from other of said seat-side or said body-side connectors in a direction opposite of said sliding direction to separate said seat-side or said body-side connector from other of said seat-side or said body-side connector.

* * * * *